(12) United States Patent
van Tooren et al.

(10) Patent No.: US 7,737,878 B2
(45) Date of Patent: Jun. 15, 2010

(54) COLLISION AND CONFLICT AVOIDANCE SYSTEM FOR AUTONOMOUS UNMANNED AIR VEHICLES (UAVS)

(75) Inventors: Joost van Tooren, Munich (DE); Martin Heni, Munich (DE); Alexander Knoll, Munich (DE); Johannes Beck, Ingolstadt (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 12/169,205

(22) Filed: Jul. 8, 2008

(65) Prior Publication Data
US 2009/0027253 A1    Jan. 29, 2009

(30) Foreign Application Priority Data
Jul. 9, 2007    (DE) ............... 10 2007 032 084

(51) Int. Cl.
  *G01S 13/93*    (2006.01)
  *G08G 5/04*    (2006.01)
  *G01S 13/00*    (2006.01)
  *G08G 5/00*    (2006.01)

(52) U.S. Cl. .............. 342/29; 342/27; 342/61; 342/62; 342/63; 342/65; 342/175; 342/195; 244/3.1; 244/3.15; 244/3.16; 244/3.18; 701/1; 701/3; 701/200; 701/207; 701/223; 701/224; 701/300; 701/301

(58) Field of Classification Search ........... 244/3.1–3.3; 89/1.11; 701/1, 3–28, 200, 207–223, 300, 701/301, 224; 342/27–51, 175, 195, 61–65; 382/100, 103; 340/945, 961
See application file for complete search history.

(56) References Cited

U.S. PATENT DOCUMENTS

| | | | | |
|---|---|---|---|---|
| 5,581,250 | A * | 12/1996 | Khvilivitzky | ............... 340/961 |
| 6,038,502 | A * | 3/2000 | Sudo | ............... 701/23 |
| 6,173,219 | B1 * | 1/2001 | Deker | ............... 701/3 |
| 6,243,482 | B1 * | 6/2001 | Eibert et al. | ............... 382/103 |
| 6,744,382 | B1 * | 6/2004 | Lapis et al. | ............... 701/200 |
| 6,842,674 | B2 * | 1/2005 | Solomon | ............... 701/23 |

(Continued)

OTHER PUBLICATIONS

J. Krozel, et al., "Free Flight Conflict Detection and Resolution Analysis", AIAA Guidance Navigation and Control Conference, American Institute of Aeronautics and Astronautics, Jul. 29-31, 1996, pp. 1-11, San Diego, CA, AIAA-96-3763.

(Continued)

*Primary Examiner*—Bernarr E Gregory
(74) *Attorney, Agent, or Firm*—Crowell & Moring LLP

(57) ABSTRACT

A collision and conflict avoidance system for autonomous unmanned air vehicles (UAVs) uses accessible on-board sensors to generate an image of the surrounding airspace. The situation thus established is analyzed for imminent conflicts (collisions, TCAS violations, airspace violations), and, if a probable conflict or collision is detected, a search for avoidance options is started, wherein the avoidance routes as far as possible comply with statutory air traffic regulations. By virtue of the on-board algorithm the system functions independently of a data link. By taking into account the TCAS zones, the remaining air traffic is not disturbed unnecessarily. The system makes it possible both to cover aspects critical for safety and to use more highly developed algorithms in order to take complicated boundary conditions into account when determining the avoidance course.

7 Claims, 4 Drawing Sheets

U.S. PATENT DOCUMENTS

| | | | | |
|---|---|---|---|---|
| 7,061,401 | B2* | 6/2006 | Voos et al. | 340/961 |
| 7,228,232 | B2* | 6/2007 | Bodin et al. | 701/301 |
| 7,233,859 | B2* | 6/2007 | Lundberg | 244/3.1 |
| 7,269,513 | B2* | 9/2007 | Herwitz | 701/301 |
| 7,299,130 | B2* | 11/2007 | Mulligan et al. | 701/213 |
| 7,512,462 | B2* | 3/2009 | Nichols et al. | 701/3 |
| 2006/0074557 | A1* | 4/2006 | Mulligan et al. | 701/213 |
| 2006/0106506 | A1* | 5/2006 | Nichols et al. | 701/3 |
| 2007/0093946 | A1* | 4/2007 | Gideoni | 701/24 |
| 2007/0106473 | A1* | 5/2007 | Bodin et al. | 701/301 |
| 2007/0129855 | A1* | 6/2007 | Coulmeau | 701/3 |

OTHER PUBLICATIONS

Nathan D. Richards, et al., "A Hybrid A*/Automaton Approach to On-Line Path Planning with Obstacle Avoidance", Sep. 20-22, 2004, AIAA 1st Intelligence Systems Conference, American Institute of Aeronautics and Astronautics. pp. 1-17. Chicago Illinois. AIAA 2004-6229.

Peter E. Hart, et al., "Correction to A Formal Basis for the Heuristic Determination of Minimum Cost Paths", pp. 28 and 29, New York, New York.

Peter E. Hart, et al., "A Formal Basis for the Heuristic Determination of Minimum Cost Paths", IEEE Transactions of Systems Science and Cybernetics, Jul. 1968, vol. SSC-4, No. 2, pp. 100-107.

Aeronautical Telecommunications, International Standards and Recommended Practices, Annex 10 to the Convention on International Aviation, Jul. 2002, vol. IV, Third Edition, pp. 1-1-1-43, attachment pp. 1-56 and Supplement to Annex 10 (ten (10) pages), International Civil Aviation Organization.

Giancarmine Fasano, et al., "Multi-Sensor-Based Fully Autonomous Non-Cooperative Collision Avoidance System for Unmanned Air Vehicle", Journal of Aerospace Computing, Information, and Communication, Oct. 2008, pp. 338-360, vol. 5.

Harold H. Szu, et al., Autonomous Collision Avoidance of Flying Vehicles, American Institute of Aeronautics and Astronautics, 2007 Conference and Exhibit, May 7-10, 2007, AIAA 2007-3008.

Eric Portilla, et al., Sense and Avoid (SAA) & Traffic Alert and Collision Avoidance System (TCAS) Integration for Unmanned Aerial Systems (UAS), American Institute of Aeronautics and Astronautics, 2007 Conference and Exhibit, May 7-10, 2007, pp. 1-12, AIAA 2007-3004.

Karin Sigurd, et al., "UAV Trajectory Design Using Total Field Collision Avoidance", American Institute of Aeronautics and Astronautics, AIAA Guidance, Navigation, and Control Conference and Exhibit, Aug. 11-14, 2003, pp. 1-11, AIAA 2003-5728.

* cited by examiner

COLLISION AND CONFLICT AVOIDANCE SYSTEM FOR AUTONOMOUS UNMANNED AIR VEHICLES (UAVS)

BACKGROUND AND SUMMARY OF THE INVENTION

This application claims the priority of German patent document 10 2007 032 084.3, filed Jul. 9, 2007, the disclosure of which is expressly incorporated by reference herein.

The present invention relates to a collision and conflict avoidance system for autonomous unmanned air vehicles (UAVs).

The operation of UAVs requires that they can be incorporated seamlessly into civil and military air traffic. Especially if there is no contact with the ground station, the UAV has to be independently capable, while observing air traffic regulations, of avoiding potential collisions without infringing its own performance limits or flying into restricted airspaces.

In conventional piloted aircraft, the TCAS (Traffic Alert Collision Avoidance System) is customarily used for this purpose. It uses its sensor components that determine the relative position of other aircraft, and based on this information, assesses the collision risk, determines reactive avoidance commands, and proposes them to the human pilot in order to avoid short-term collisions.

In the "Free flight conflict detection and resolution analysis" method (Kroyel, Mueller, Hunter), a two-stage system (tactical, strategic) for conflict avoidance in air traffic is proposed, while the article "A Hybrid A* Automaton approach to online path planning with obstacle avoidance" by N. D. Richards, M. Sharma, D. G. Ward, in AIAA 2004-6229, pp. 1-17, 2004, suggests an A* path search based on movement segments. (In the field of computer science the notation "A*", pronounced "A star", refers to a known graph search algorithm that determines a least cost path from a starting node to a goal node, out of one or more possible goals.)

The following components are known from the literature:
A* algorithm
    P. E. Hart, N. J. Nilsson, B. Raphael, "Correction to: A Formal Basis for the Heuristic Determination of Minimum Cost Paths", SIGART Newsletter, 37, pp. 28-29, 1972
Path segments (Motion primitives)
    N. D. Richards, M. Sharma, D. G. Ward, "A Hybrid A*/Automation Approach to On-line Path Planning with Obstacle Avoidance", AIAA 2004-6229, pp. 1-17, 2004
Two-stage method "tactical" & "strategic"
    Free Flight Conflight Detection (Kroyel, Mueller, Hunter)
TCAS
    ICAO Annex 10, "Surveillance Radar and Collision Avoidance Systems", ICAO Annex 10 Vol. IV, 2002
Conflict avoidance:
    Aircraft Separation Systems
    Free Flight Conflight Detection (Kroyel, Mueller, Hunter)
Collision avoidance, as such
    Multisensor based Fully Autonomous Non-Cooperative Collision Avoidance System for UAVs (Fasano et al)
    Autonomous Collision Avoidance of flying Vehicles (Szu et al)
    Sense And Avoid (SAA & Traffic Alert and Collision Avoidance System (TCAS) Integration for Unmanned Aerial Systems (UAS) (Portilla et al)
    UAV TRAJECTORY DESIGN USING TOTAL FIELD COLLISION AVOIDANCE (Sigurd et al)

In contrast to the prior art, the collision and conflict avoidance system according to the invention uses available on-board sensors in order to make for itself an image of the surrounding airspace. The situation thus established is analyzed for imminent conflicts (collisions, TCAS violations, airspace violations). If a problem is detected, a search is initiated for avoidance options which, as far as possible, comply with statutory air traffic regulations. According to the invention, depending on the available time budget, either a short-term reactive algorithm by means of direct FCS (Flight Control System) commands, or a medium-term path planning algorithm (which determines a flight plan optimized under aeronautical and economical boundary conditions) may be used. After the danger has been avoided, the UAV is returned to the original route.

The two tiered method and system according to the invention (that is, reactive and/or path planning) offers the following advantages:

The introduction of an on-board system into autonomous UAVs for conflict and collision avoidance allows their use in civil and military airspace in parallel and transparently to conventional aircraft. Because it uses an on-board algorithm the system functions independently of a data link, and because the TCAS zones are taken into account the remaining air traffic is not disturbed unnecessarily. The hybrid (two tier) system makes it possible both to cover aspects critical for safety and to use more highly developed algorithms in order to take complicated boundary conditions into account when determining the avoidance course.

Other objects, advantages and novel features of the present invention will become apparent from the following detailed description of the invention when considered in conjunction with the accompanying drawings.

DETAILED DESCRIPTION OF THE DRAWINGS

The Components of the Conflict and Collision Avoidance System

Figure 1:
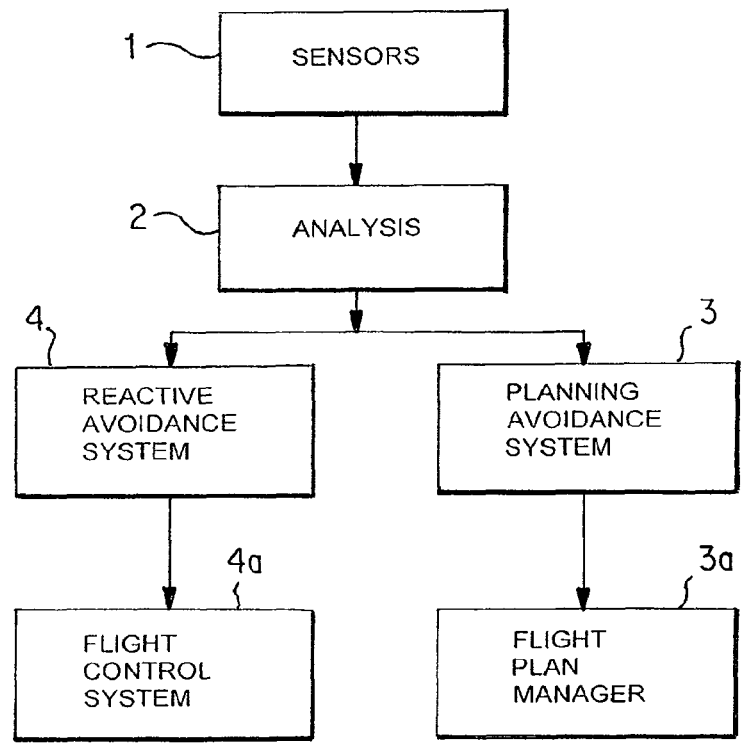
FIG. 1 shows the individual sub-systems of the proposed system.
Figure 2:
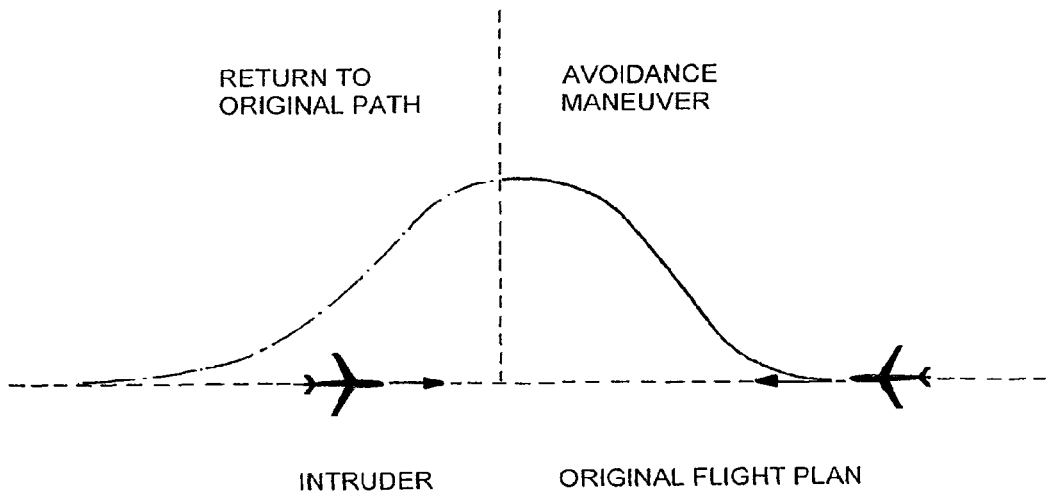
FIG. 2 shows an avoidance maneuver implemented by the system.

As illustrated schematically in FIG. 1, the system according to the invention uses available on-board sensors 1 to make for itself an image of the surrounding airspace. An analysis unit 2 analyzes the situation thus established for imminent conflicts (collisions, TCAS violations, airspace violations). If a problem is detected, a hierarchical search is initiated for avoidance options that follow avoidance routes which maximize compliance with statutory air traffic regulations. As shown in FIG. 1, according to the invention, depending on the available time budget a short-term reactive algorithm 4, which utilizes direct FCS commands 4a may be implemented. Or if time permits, a medium-term path planning algorithm 3 may be used, which determines a flight plan 3a optimized under aeronautical and economical boundary conditions. In either case, as shown in FIG. 2, the UAV is returned to the original route after the danger has been averted. FIG. 1 shows the individual sub-systems of the system according to the invention, which includes both the reactive component and the avoidance maneuvers component 3.

The Computer System

The system may be implemented in one or more physical computers on board the UAV. That is, while it may in principle be realized in a single computer, it may also be split among a plurality of computers if the computing capacity of one computer is inadequate, the safety-critical software is to be separated from the safety-non-critical software, or the modules are to be functionally split among various computers.

Position Sensors for Determining the Positions of the Surrounding Aircraft

The system uses all of the sensors 1 available on board the UAV that are suitable for detecting other aircraft and obstacles. Examples of sensors are:

TCAS sensor
radar
IR sensors
optical sensors

Path Prediction and Risk Assessment for all Surrounding Aircraft

Figure 1A:
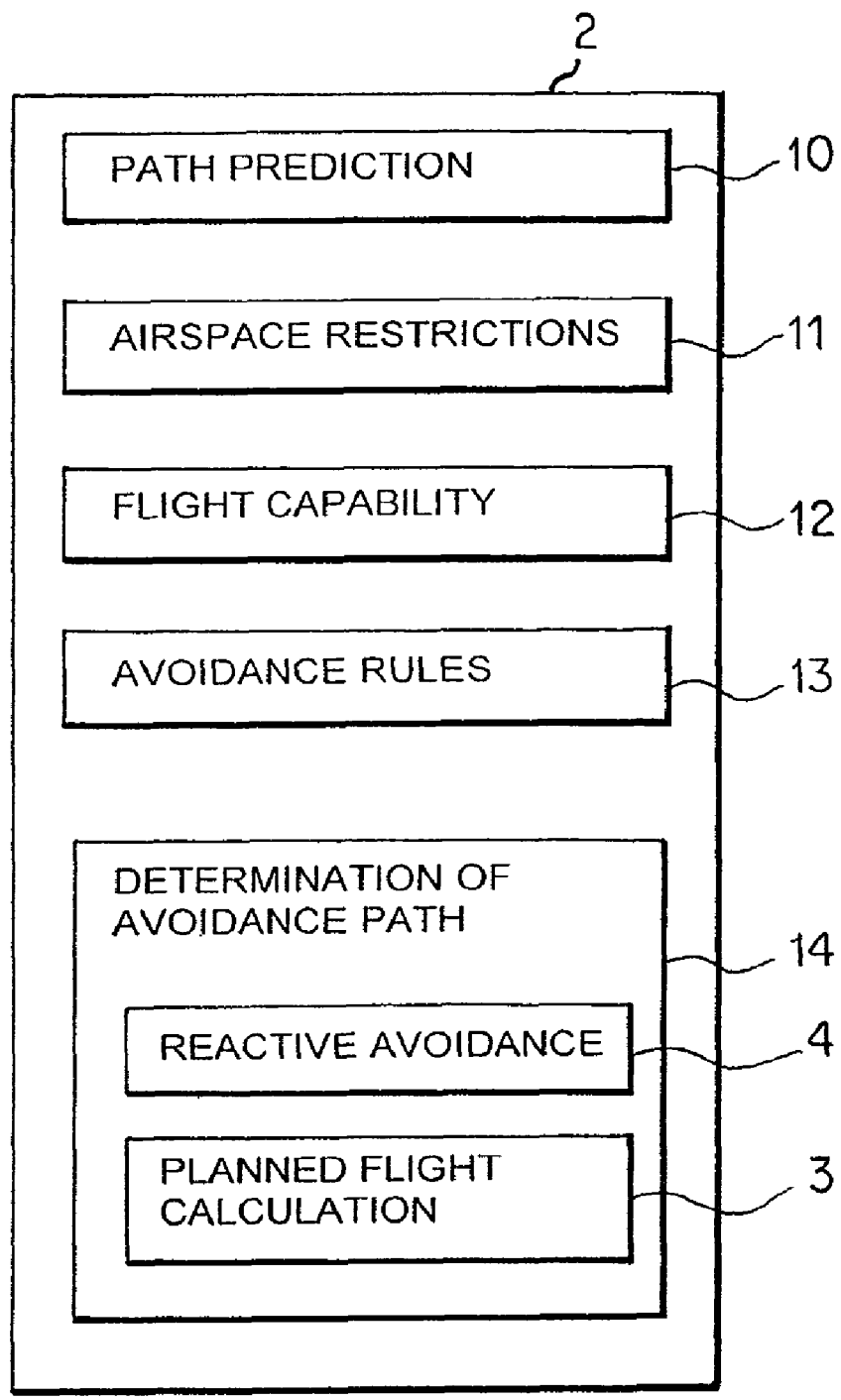
FIG. 1A shows the components of the analysis performed by the analysis unit in FIG. 1.
Figure 3:
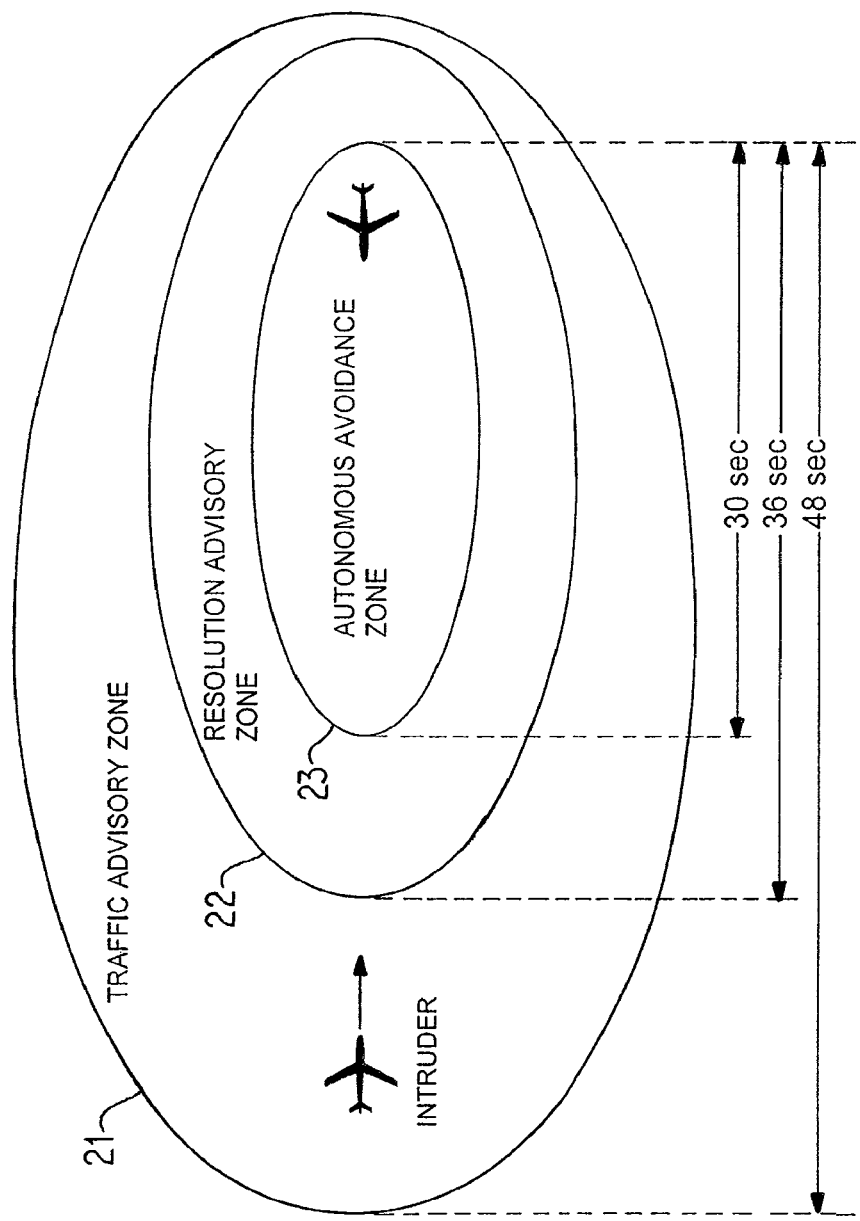
FIG. 3 shows the airspace zones used to assess the situation.

FIG. 1A shows the components of the analysis performed in the analysis unit 2 of FIG. 1. A path prediction module 10 extrapolates the paths of all objects detected by the sensors, and based on this information, produces a prognosis for the flight paths of these objects. For each object the possibility of a collision is calculated, using the predicted paths and the UAV flight path to check for a violation of zones around the aircraft. These zones include the TCAS Traffic Advisory (TA) zone 21, and Resolution Advisory (RA) zone 22. (FIG. 3.) If the prognosis is that a violation of the TCAS RA zone 21 exists, a planned avoidance maneuver 13 is initiated. Over and above this, according to the inention a further Autonomous Avoidance (AA) zone 23 is provided. An imminent violation of this zone triggers a reactive avoidance maneuver 4a.

All of the zones are made up of two components: a fixed distance around each aircraft that should not be violated and a time for reaching this boundary. The combined result is zones as outlined in FIG. 3.

The potential risks are prioritized according to the worst possible zone violation. This prioritization then determines the type of avoidance maneuver. Given a plurality of identical violations, an avoidance route that avoids all known conflicts is selected.

Module for Determining Airspace Restrictions

The avoidance maneuvers take account of any airspace restrictions. In particular, avoidance maneuvers may be planned in such a way that they do not depart from a specific corridor around the original flight path. Airspaces may moreover be designated as closed. These zones are then not taken into account by the algorithm.

All airspace restrictions are made available by a system module 11 to the planning algorithms.

Module for Determining the Available Flight Capability of the System Aircraft

Possible avoidance maneuvers depend upon the flight capability of the aircraft at the time of the conflict, which may be reduced from the nominal capability as a result of technical faults, external restrictions or by the actual flight situation. A system module 12 monitors these restrictions and filters possible avoidance maneuvers so that they are effected only within the available flight capacity limits.

Decision logic for determining the appropriate avoidance rules

Figure 4:
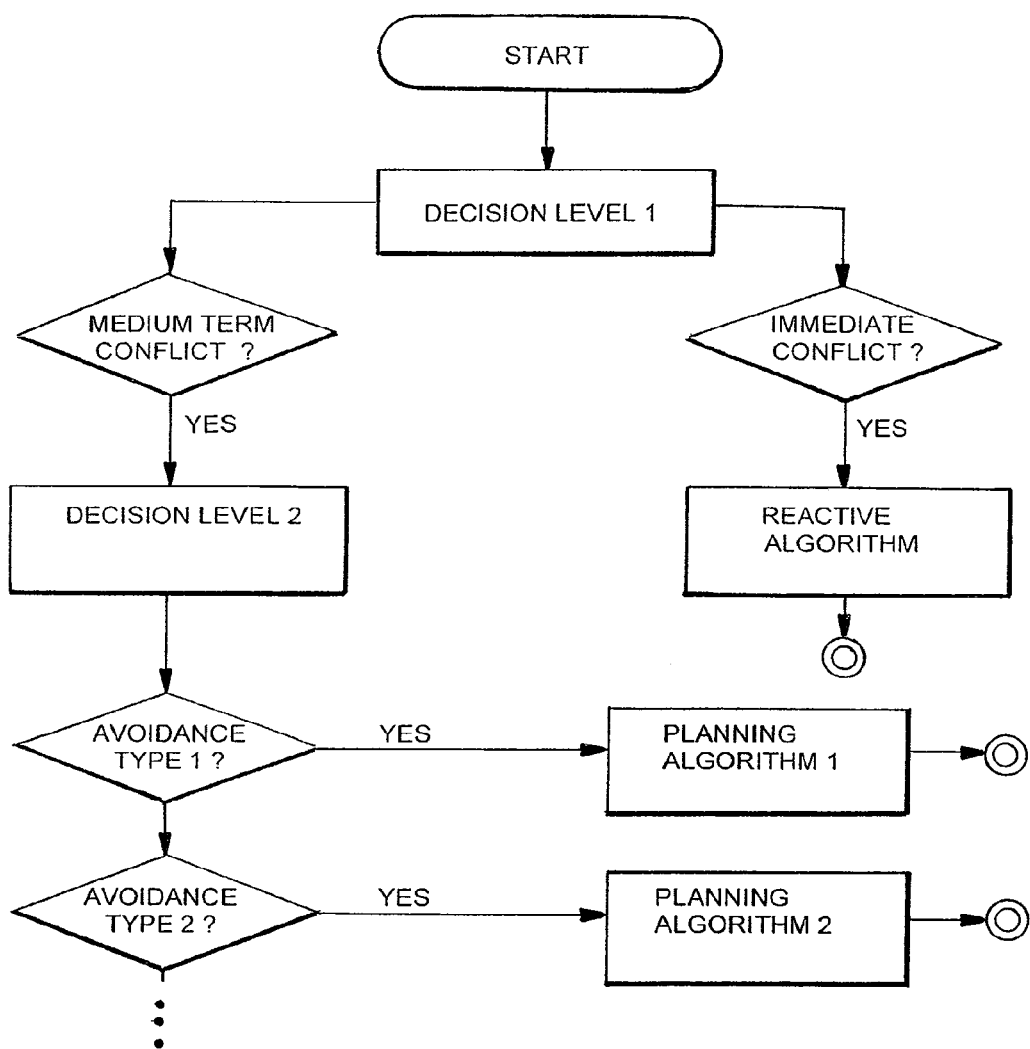
FIG. 4 is a flow chart that illustrates the decision-making process.

The determination of the selected avoidance algorithm 13 (reactive or planned) as well as the selected avoidance strategy, is effected in a two-stage hierarchical decision-making process, as shown in FIG. 4:

First it is decided (Decision level 1) whether there is enough time to calculate and implement a planned avoidance maneuver, if not, a reactive avoidance maneuver is implemented immediately. If, however, there is enough time, a planning algorithm (Decision level 2) is started. This algorithm is based on an A* path-searching algorithm, which however is occasionally started a plurality of times with various boundary conditions. This configuration depends upon the scenario, typical possibilities being:

1. search for horizontal 2D path, to the right
2. search for vertical 2D path up or down
3. search for 3D path up to the right or down to the right
4. search for horizontal 2D path to the left
5. search for full 3D path.

In each case, it is checked whether the path search is completed within a defined time frame. If no solution is found within this time frame, and so the prognosis is an imminent AA zone violation, the decision level 1 is repeated and possibly the reactive algorithm is triggered as a safety net.

Determination of the Planned Avoidance Route Including Return to the Original Flight Path Reactive Flight Path Calculation for Rapid Determination of a Simple Avoidance Path The reactive algorithm 4 (FIG. 1) of a path determination unit 14 generates a simple banking maneuver that flies the aircraft out of the danger zone. Possible maneuvers are, of course, restricted by modules relating to the flight capability and airspace restrictions. Once the danger zone has been avoided, a flyable return maneuver to the original route is initiated. (See FIG. 2.) These maneuvers are relayed as direct commands to the flight controller.

Planned Flight Path Calculation for Determining an Optimum Avoidance Path

A path planning algorithm (for example, A*) is used, which makes it possible to calculate an optimum path based on a defined cost function. The algorithm puts together small path sections (motion primitives, motion segments) in various combinations in order to find the optimum combination for the defined cost function. These path sections are defined as flyable segments, which contain for example curves and linear segments. Possible maneuvers are restricted by modules relating to flight capability and airspace restrictions. The path-searching algorithm is set in such a way that it searches for a risk-free section along the original route as a target. Thus, the avoidance route will lead from a position on the original route back to a position of the original route.

The cost function determines which route the planning algorithm finds to be the optimum one. Here, various parameters (also in combination) may be employed. Examples are:

length or time of the avoidance route
fuel consumption
air traffic regulations
number of necessary maneuvers and/or changes of maneuver
load factor during the maneuver
intrusion into undesirable or prohibited airspace The optimum avoidance path thus calculated is then inserted into the original flight plan.

Dynamic Obstacles

The zones described above depend upon the relative geometry of the system aircraft in relation to each potential collision partner. The result is a highly dynamic situation, in which the zones vary in shape and size not only constantly in flight but also with each step of an avoidance planning operation. In order correctly to acquire this situation, it is necessary to extrapolate the flight paths of all involved aircraft in each step of a planning operation and at the same time update the zone calculations. The algorithms work with these extrapolated zones. Errors that have arisen as a result of the extrapolation are absorbed by introducing buffers around the zones described above. In any case, it is important that the calculated trajectories during the avoidance maneuver are also flyable as, given too great a deviation from the planned trajectory, the actual zones do not match the predicted zones and so conflicts may be triggered.

Safety Aspects

As shown in FIG. 1, the system contains two main functionalities for avoidance:

1. a safety-critical reactive sub-system 4, which can very rapidly calculate an avoidance maneuver. The maneuver will not conflict with any hard boundary conditions, such as for example a TCAS Advisory, but will not guarantee an optimum flight path.
2. a safety-non-critical sub-system 3 based on a planning algorithm. This algorithm takes more time and is more complex as it takes all possible boundary conditions into account and guarantees an optimum avoidance route.

At all times (including while the planning algorithm is running), it is checked whether the situation is becoming critical (imminent AA zone violation). If so, the reactive safety algorithm is immediately activated.

The introduction of an on-board system into autonomous UAVs for conflict and collision avoidance allows their use in civil and military airspace in parallel and transparently to conventional aircraft. By using an on-board algorithm, the system can function independently of a data link; and by taking into account the TCAS zones, unnecessary disturbance of the remaining air traffic is avoided. The hybrid system makes it possible both to cover aspects critical for safety and to use more highly developed algorithms in order to take complicated boundary conditions into account when determining the avoidance course.

The system therefore provides at least the following novel aspects:
- two-stage method, including reactive and planned components, wherein reactive is safety-critical
- taking account of the TCAS zones to prevent triggering RAs
- decision-making process, in which direction avoidance is to occur
- return to original route The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A collision and conflict avoidance system for an autonomous unmanned air vehicles, comprising:
   on-board radar, TCAS, IR, and optical sensors used by the system to generate an image of the surrounding airspace; and
   an analysis unit that analyzes a situation thus established for imminent conflicts comprising at least one of collisions, TCAS violations, and airspace violations, and, if a conflict is detected, that initiates a search for avoidance options, which provide avoidance routes that maximize compliance with applicable air traffic regulations.

2. The collision and conflict avoidance system according to claim 1, wherein either i) a short-term reactive algorithm by means of direct FCS commands, or ii) a medium-term path planning algorithm, which determines a flight plan optimized under aeronautical and economical boundary conditions, is implemented depending on time available for an avoidance maneuver.

3. The collision and conflict avoidance system according to claim 2, wherein after the conflict has been resolved, the UAV is returned to its original route.

4. The collision and conflict avoidance system according to claim 1, wherein, after the conflict has been resolved, the UAV is returned to its original route.

5. A method for collision and conflict avoidance for an unmanned aircraft, said method comprising:
   sensors accessible on board said aircraft detecting objects in airspace surrounding said aircraft;
   a path prediction module extrapolating flight paths for said objects detected by said sensor;
   for each such object, determining the probability of a conflict or collision based on predetermined zones surrounding said aircraft;
   if a conflict or collision is determined to be probable, initiating an avoidance maneuver to avoid such conflict or collision; wherein,
   if it is determined that the object will enter a first, relatively larger, predetermined zone, a planned avoidance maneuver is implemented, based on a path planning algorithm which determines a flight plan that is optimized under aeronautical boundary conditions; and
   if it is determined that the object will enter a second, relatively smaller predetermined zone, a reactive avoidance maneuver is implemented autonomously.

6. The method according to claim 5, wherein, after the determined probability of a conflict or collision has been eliminated, the aircraft is returned to its original flight path.

7. The method according to claim 5, further comprising:
   prioritizing potential conflict or collision risks according to the most intrusive possible zone incursions; and
   determining avoidance maneuvers based on such prioritization.

* * * * *